Feb. 9, 1954
J. P. BUTTERFIELD ET AL
2,668,460
POWER TRANSMISSION UNIT
Filed March 2, 1951
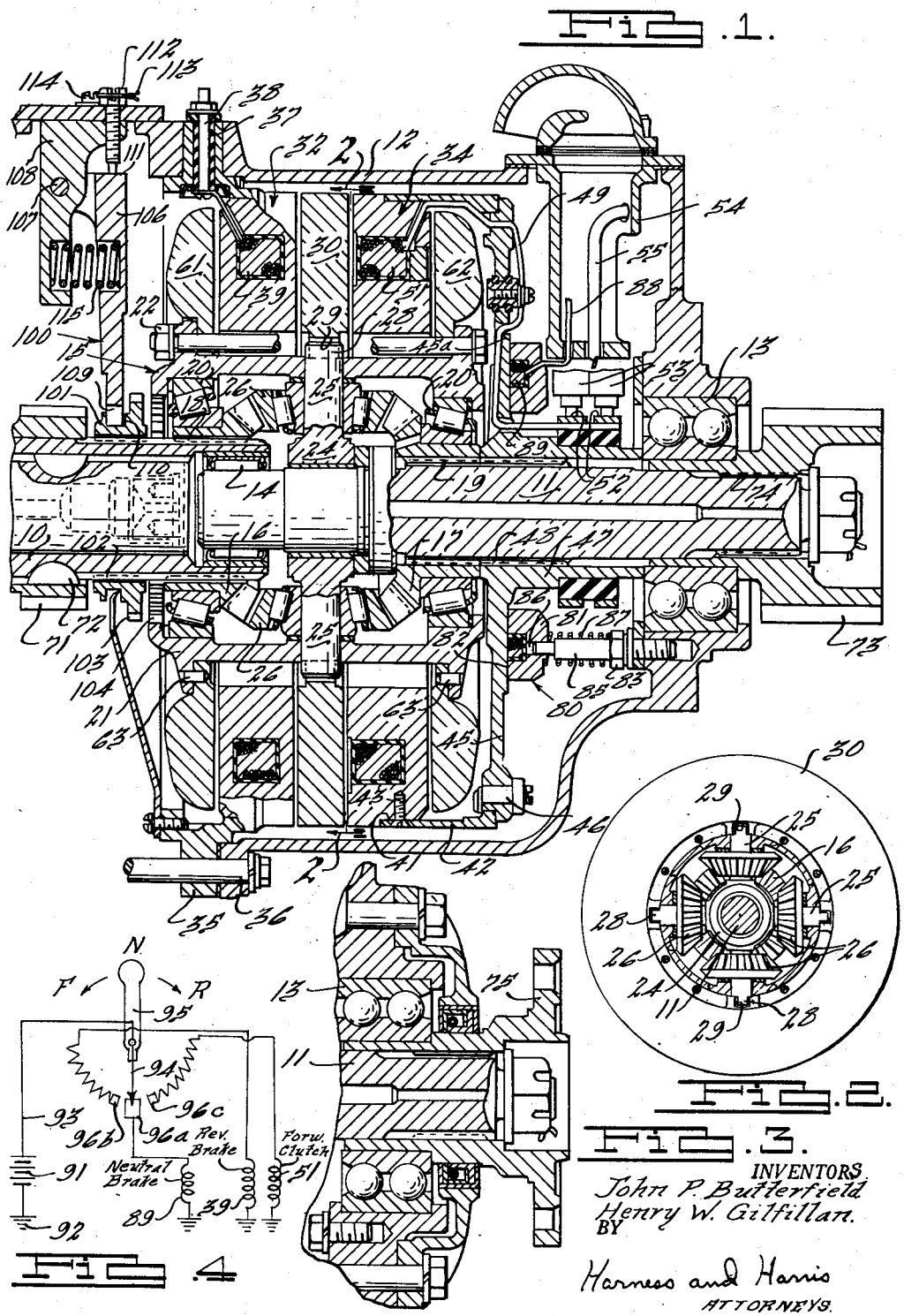
INVENTORS.
John P. Butterfield
Henry W. Gilfillan.
BY
Harness and Harris
ATTORNEYS.

Patented Feb. 9, 1954

2,668,460

UNITED STATES PATENT OFFICE 2,668,460

POWER TRANSMISSION UNIT

John P. Butterfield, Grosse Pointe Woods, and Henry W. Gilfillan, Detroit, Mich., assignors to Chrysler Corporation, Highland Park, Mich., a corporation of Delaware Application March 2, 1951, Serial No. 213,522

6 Claims. (Cl. 74—780)

This invention relates to power transmission units and particularly to power transmission units adapted for use as reversing drive gearing in marine drive train installations.

It is a primary object of this invention to provide a compact power transmission gear box adapted for use as a reduction and reverse gear unit in a marine drive train installation wherein the forward and reverse drives are controlled by electrically operated means that may be easily and economically located at any point adjacent to or remote from the gear box. Reverse and reduction gearing of the type herein disclosed has been conventionally operated by mechanical linkages or by hydraulically operated mechanisms and each of these types of controls has several rather obvious disadvantages. Mechanical linkages develop wear and free-play that often render the control mechanisms difficult to operate. In addition mechanical controls are expensive and they are also difficult to install at control stations remote from the transmission unit. Hydraulic controls necessitate pressure fluid pumps and pressure fluid conduits that are expensive. In addition the fluid conduits that must be run to the various control stations throughout the ship provide a constant source of possible failure which failure not only renders the control system inoperative but further has the danger of distributing the pressurized control fluid to various localities of the ship where it might ignite fires or damage property stored aboard the ship. With the electrically operated control system herein disclosed conventional weatherproofed wiring may be easily and economically run from the transmission gear box to any number of control stations throughout the ship and the operation of the gear box control does not require the shifting of mechanical linkages nor the transfer of pressurized fluid between various locations about the ship.

It is a further object of this invention to provide a power transmission unit having brake means adapted to anchor the driven shaft against rotation when the power transmission is in a no-drive or neutral condition.

It is a further object of this invention to associate a mechanically operable clutch device with the electrically controlled power transmission unit whereby positive drive transmitting connections are always available to connect the driving and driven members of the power transmission unit in the event of failure of the electrically operated power transmission control system.

It is still another object of this invention to provide a simplified, improved, reversing gear box with novel control means therefor.

It is still another object of this invention to provide a power transmission unit having gearing connectible between the driving and driven shafts thereof by two types of connections namely an electromagnetically operated friction drive transmitting connection and a positively engageable mechanical drive transmitting connection.

Other objects and advantages of this invention will become readily apparent from a reading of the attached description of the invention and a consideration of the related drawings wherein:

Fig. 1 is a sectional elevational view of the power transmission unit embodying these inventions;

Fig. 2 is a sectional elevational view taken along the line 2—2 of Fig. 1 the view being to a reduced scale;

Fig. 3 is a fragmentary sectional elevational view of an alternate form of driven shaft end connection; and Fig. 4 is a schematic view of the electrical control circuit from the power transmission unit disclosed in Fig. 1.

The power transmission unit shown in Fig. 1 of the drawings comprises driving and driven shafts 10 and 11 respectively, said shafts being axially aligned and journalled in the encircling housing unit 12. The bearing support for driving shaft 10 in housing 12 is not shown whereas the bearing support 13 for the driven shaft 11 is clearly disclosed. The forward end of driven shaft 11 is shown piloted within the rear end portion of driving shaft 10 by means of a bearing assembly 14. Encircling and extending between the adjacent ends of the shafts 10, 11 is a differential gear unit 15. Differential gear unit 15 comprises a pair of axially spaced apart side gear elements 16 and 17 respectively. Side gear element 16 is drivingly connected to the driving shaft 10 by means of the splined connection 18. Side gear element 17 is connected to the driven shaft 11 by means of the splined connection 19. Encircling the axially spaced side gears 16, 17 and journalled thereon by means of the bearings 20 is the differential carrier case 21. Carrier case 21 is of a two-piece or split case construction wherein the two parts of the casing are held in assembled position by means of a plurality of bolt and nut connections 22.

Mounted within the carrier case 21 and journalled on the forward end portion of the driven shaft 11 is a pinion gear support member 24.

Pinion gear support member 24 comprises a hub portion with a plurality of radially extending spoke elements 25 projecting from the hub that journal the several differential pinion gears 26. In the construction herein disclosed the support member 24 has four spoke elements 25 which spoke elements are arranged at right angles to one another (see Fig. 2). The outer ends of the several spoke elements 25 pierce the wall of the carrier case 21 and project radially outwardly therebeyond a sufficient distance to provide stud formations 28 that are adapted to be drivingly seated in slotted formations 29 formed in the inner peripheral edge of armature member 30. The connections 28, 29 between the spokes 25 and the armature 30 permit axial shift of the armature 30 relative to the differential case 21. The function of the armature member 30 will be subsequently described.

In the construction herein disclosed the differential pinion gear elements 26 are formed as combination bearing and gear elements wherein the outer race of the bearing element provides the pinion gear element that meshingly engages with and extends between the axially spaced apart side gear elements 16, 17. It is realized that other types of differential pinion gears than those herein disclosed may be utilized in a differential transmission gearing of the type herein disclosed without altering applicant's invention in any way but this type of pinion gearing has been found to be quite satisfactory.

Encircling the differential carrier case 21 and arranged on opposite sides of the armature member 30 are a pair of electromagnetic coil elements 32 and 34 respectively. The coil elements 32 and 34 are substantially thick rings that include means around their outer peripheral surfaces whereby the rings may be supported in predetermined positions within the housing 12. Coil ring 32 is fixedly connected to the housing 12 by means of the peripheral flange formation 35 that is connected to housing 12 by the bolt and nut connectors 36. Flange formation 35 is pierced by an opening 37 that receives a conductor element 38 adapted to connect the coil 39 of ring 32 to a suitable electrical source.

The coil ring 34 has a step formation 41 in its outer peripheral surface that receives a ring element 42. Ring element 42 is connected to the coil ring 34 by means of screw connectors such as the connector 43. Ring 42 is supported by and connected to a spider element 45 by means of bolt connections 46. Hub element 47 of the spider element 45 is drivingly connected to the driven shaft 11 by means of the splined connection 48. Spider element 45 has suitably mounted therein conductor elements 49 that are adapted to transmit electrical energy from a suitable supply source to the coil element 51 of the coil ring 34. As spider element 45 is rotatable a suitable slip ring connection 52 is provided between the fixed electrical contacts 53 and the rotatable conductors 49. The leads 55 for the fixed contacts 53 may be supported in the walls of a transmission case breather pipe 54 or anchored in position within housing 12 in any other suitable manner.

Encircling the carrier case 21 of the differential gear unit 15 and arranged on the outer sides of the coil elements 32 and 34 are a pair of armature members 61 and 62 respectively. The armature members 61 and 62 are drivingly connected to the carrier case 21 by means of drive pin connections such as the pins 63. Armature elements 61 and 62 are axially shiftable along the carrier case 21 due to the looseness of the pin connections 63. Resilient means, not shown, may be provided to normally space each of the armature members 30, 61, 62 from the adjacently positioned electromagnetic coil rings 32 and 34. Such resilient means are not absolutely necessary and can be omitted if desired.

Operation of the power transmission unit hereinabove described is as follows:

If the driven shaft 11 is to be driven forwardly, that is in the same direction as the driving shaft 10, then the electromagnetic clutch element 34 is energized and the electromagnetic brake element 32 is deenergized whereby the armature members 30 and 62 will be drawn into frictional engagement with the opposite side surfaces of the coil member 34 such that the carrier case 21 and the driven shaft 11 will be drivingly locked together. With the carrier case 21 fixed to the driven shaft 11 the differential gearing 16, 26, 17 is locked in a fixed condition and drive is transmitted directly from the driving shaft 10 to the driven shaft 11 at a 1 to 1 ratio. If reverse drive is to be transmitted through the gear box, that is drive of the driven shaft 11 in a direction opposite to that of the drive shaft 10, then the electromagnetic brake 32 is energized and the electromagnetic clutch element 34 deenergized whereby the armature elements 61 and 30 are drawn into frictional engagement with the opposite side surfaces of the fixed brake element 32. Engagement of the armature member 30 with the fixed brake element 32 anchors the differential carrier case 21 against rotation. With the carrier case 21 anchored to the housing 12 by brake 32 then rotation of the driving side gear 16 will cause the pinion gear elements 26 to rotate in such a manner that the driven side gear 17 will be rotated in a direction opposite to that of the driven side gear 16. As side gears 16, 17 are fixedly connected to their respective shafts 10, 11 it is obvious that the driven shaft 11 will be driven in a direction opposite to that of the driving shaft 10.

Input to the driving shaft 10 may be directly from an engine crankshaft or through gearing (not shown) that is meshingly engaged with the pinion gear element 71 that is keyed to the driving shaft 10 as at 72. The output from driven shaft 11 may be transmitted to a final drive element (not shown) through reduction gearing (not shown) that is meshingly engaged with the drive pinion 73 that is splined to the rear end portion of driven shaft 11 by the connection 74. If direct drive from the driven shaft 11 to a final drive element such as a prop shaft or the like is desired, then, a flanged connection such as that shown at 75 in Fig. 3 may be utilized to connect driven shaft 11 to the final drive member to be driven thereby.

Marine reversing gearing of the general type herein disclosed has been plagued by a phenomena that is very objectionable and often causes serious trouble. This phenomena results from the fact that when the power transmission gearing is established in a neutral or no-drive condition, there is a broken driving train between the driving and driven shafts that will permit the driven shaft 11 to rotate freely in either direction. Accordingly, if the transmission is moved from a forward or reverse drive transmitting condition to the neutral position the passage of water through the associated propeller shaft, as the boat glides through the water, is sufficient to keep the propeller shaft rotating and frequently the rotating propeller will foul lines, fish nets and other gear located beneath the vessel. An even more serious consequence of the fact that there is a broken drive connection between the driving and driven shafts when the transmission gearing is arranged in a neutral or no-drive condition, results from the fact that friction within the gear unit 15 may be sufficient to cause the differential gearing to transmit some drive between the driving and driven shafts 10, 11 even though the clutch and brake devices 32, 34 of the transmission gearing are in a deenergized condition. As a result, if the transmission is in neutral and the engine is idling or being raced to warm it up, there is danger that the propeller shaft will rotate and the ship may move either forwardly or in a reverse direction unless it is suitably anchored at the time. This undesired movement of the vessel due to the friction of the differential gearing transmitting drive can frequently cause damage to the vessel and/or to fishing gear or structures located adjacent to or beneath the vessel at the time of the unintended movement.

The invention herein disclosed provides a means for eliminating any undesired movement of the driven shaft 11 whenever the transmission gearing is in a no-drive or neutral condition. Unintended rotation of the driven shaft 11 is prevented by means of the brake mechanism 80 that is adapted to be frictionally engaged with a side surface of the spider element 45 whenever the transmission is conditioned for neutral or no-drive. Brake mechanism 80 comprises an electromagnetic coil ring 81 having a side surface 82 that is normally maintained in light frictional engagement with the surface portion 45a of the spider element 45. Coil ring 81 is supported from the transmission housing 12 by means of a plurality of stud bolts 83 (only one shown). Bolts 83 have their threaded ends connected into the housing 12 so as to lock the bearing elements 13 in position in the housing 12. The head ends of the bolts 83 are provided with axially extending stud-like formations 85 that seat in bores 86 in the coil ring 81 so as to anchor the coil ring 81 against rotation. Stud portions 85 of bolts 83 mount compression springs 87 that normally urge the coil ring 81 into light engagement with the surface portion 45a of the spider 45. Conductors 88 that connect the coil 89 of coil ring 81 to a suitable source of electrical energy may be housed within the breather pipe 54 in the same manner as previously described with regard to the conductors 55 for the slip ring device 52, 53.

The control circuit for the several electromagnetically operated clutch and brake elements associated with this transmission is schematically shown in Fig. 4. In this circuit diagram the battery or generator or other source of electrical energy 91 is grounded at 92 and is connected by conductor 93 to a movable contact 94 that is carried by the transmission control lever 95. Control lever 95 may be located at any point either near to or remote from the transmission gear box embodying this invention. Movable contact 94 of the control lever 95 is adapted to be selectively engaged with the contacts 96a, 96b or 96c. When control lever 95 is placed in the neutral or no-drive position designated by the letter N in Fig. 4 then contact 94 engages contact 96a and the coil 89 of the brake device 80 is energized so as to anchor the spider member 45 and associated driven shaft 11 against rotation. If forward drive, indicated by the letter F in Fig. 4 is desired, then control lever 95 is moved toward the left or counterclockwise so that it will be engaged with the contact 96 to thereby energize the clutch coil 51. It will be noted that on moving the control lever 95 from the neutral to the forward drive position that first the movable contact 94 is disengaged from the contact 96a so that the brake device 80 is released and thereafter the contact 94 is engaged with the contact 96c to activate the clutch 34 of the power transmission unit for the transmission of forward drive. Conversely, if reverse drive is desired the control lever 95 is moved from the neutral position N towards the right or in a clockwise manner towards the reverse drive position indicated by the letter R in Fig. 4 and the movable contact 94 will first become disengaged from the contact 96a and thereafter engaged with the contact 96b to activate the electromagnetic brake 32. With the transmission control mechanism herein disclosed it is thought to be obvious that the brake device 80 will be activated whenever the transmission is moved from a drive transmitting condition F or R into a so-called neutral or no-drive condition N. Accordingly, there will never be rotation of the driven shaft 11 except at a time when the transmission has actually been set for a drive transmitting condition.

The power transmission unit hereinabove described is arranged to be controlled by electrically operated means that require a continuous source of electrical energy. To prevent the electrically controlled power transmission unit from being inoperative when there might be a failure in the power supply source, this transmission includes means whereby an auxiliary, mechanically operated, clutch device 100 may be manually operated to positively connect the driving and driven shafts 10, 11 irrespective of the condition of the electrical controls for the power transmission unit. The manually operable mechanical clutch 100 comprises a toothed sleeve 101 splined to the driving shaft 10 at 102 and shiftable axially along the driving shaft 10. The teeth 103 of sleeve 101 are adapted to be moved into and out of engagement with teeth 104 formed around the periphery of an opening in the side wall of the carrier case 21. When the teeth 103 of sleeve 101 are engaged with the teeth 104 of carrier case 21 then driving shaft 10 and carrier case 21 are locked together in such a manner that the differential gearing 16, 26, 17, becomes a unitary structure and transmits direct drive from the drive shaft 10 to the driven shaft 11. The clutch device 100 is the mechanical equivalent of the electromagnetically operated clutch 34 and thus this transmission includes two means whereby direct drive may be transmitted between the shafts 10, 11, one means being the mechanical clutch 100 and the other means the electromagnetically controlled clutch 34.

Actuation of the toothed clutch sleeve 101 is controlled by the movement of the clutch operating lever 106. Lever 106 is pivoted at 107 to an ear 108 carried by the transmission housing 12. The free end 109 of lever 106 is positioned in a groove 110 formed in the sleeve 101 such that sleeve 101 may rotate relative to the lever end 109. The pivoted end of lever 106 has a portion 111 arranged to be engaged by the threaded end of a set screw 112 which screw is threadably mounted in the transmission housing 12. Normally the set screw 112 is threaded into the housing to such a degree that the pivoted lever 106 is held in the position shown in Fig. 1. Set screw 112 is maintained in this position by means of the anchor wire 113 that is connected between an anchor device 114 and the head of the set screw 112. Resilient means such as the spring 115 is compressed between the housing wall 109 and the clutch operating lever 106 such that on release of the set screw 112 the spring 115 will swing the operating lever 106 counterclockwise about its pivot point 107 and thereby move the toothed sleeve 101 into engagement with the teeth 104 of the carrier case 21. Due to the availability of the positive clutch mechanism 100, it always is possible to transmit drive between the shafts 10 and 12 even though the electrical system for controlling the several electromagnetic clutches and brakes 32, 34, 80 might be inoperative. Furthermore, as the clutch device 100 can be utilized to positively connect the driving and driven shafts 10, 11 it is possible to start the engine unit associated with this power transmission device by means of pulling the vessel through the water and causing the propeller to drive the engine and to thus cause firing of the engine even though the electrical system might be dead. The incorporation of a positive safety clutch such as a clutch 100 in an electrically operated power transmission unit of the type herein described is considered to be a very definite improvement in mechanisms of the type herein described. It will be noted that the positive clutch device 100 may be simultaneously engaged during engagement of the electromagnetically operated clutch 34 to prevent slip of the clutch 34, or it may be separately operated when the clutch 34 is inoperative.

We claim:

1. In a transmission comprising a housing journalling a pair of axially aligned driving and driven shafts, a differential gear set connected between said shafts comprising a carrier case extending between and rotatably mounted on said shafts, a side gear drivingly mounted on each of said driving and driven shafts, said side gears being arranged in spaced apart, opposed relationship within said carrier case, pinion gearing journalled in said carrier case and arranged to extend between and meshingly engage said side gears, a ring-like armature encircling and drivingly connected to and axially shiftably mounted on said carrier case, an annular electromagnetic brake element fixed to said housing and encircling said case and arranged adjacent a side surface of said armature, energization of said brake element being effective to anchor said armature member and said carrier case to said housing to provide means for the drive of said driven shaft in a direction opposite to that of said driving shaft, an annular electromagnetic clutch element carried by said driven shaft and encircling said case and arranged adjacent another side surface of said armature, energization of said clutch element being effective to drivingly connect said carrier case and said driven shaft to provide means for the drive of said driven shaft in the same direction as said driving shaft, said aforementioned armature and associated clutch and brake elements being arranged concentrically about said carrier case, a second electromagnetic brake element fixed to said housing having portions arranged adjacent to and adapted to be engaged with portions of said driven shaft on energization of said second brake element to anchor said driven shaft against rotation in either direction, and a control circuit for said electromagnetic clutch and brake elements whereby said second electromagnetic brake element is automatically energized upon deenergization of both said first brake element and said clutch element.

2. In a transmission comprising a housing journalling a pair of axially aligned driving and driven shafts, a differential gear set connected between said shafts comprising a carrier case extending between and rotatably mounted on said shafts, a side gear drivingly mounted on each of said driving and driven shafts, said side gears being arranged in spaced apart, opposed relationship within said carrier case, pinion gearing journalled in said carrier case and arranged to extend between and meshingly engage said side gears, a ring-like armature assembly drivingly connected to and encircling said case, said armature assembly being shiftable axially on said carrier case, an annular electromagnetic brake element fixed to said housing and encircling said case and arranged adjacent a side surface of said armature assembly, energization of said brake element being effective to anchor said armature member and said carrier case to said housing to provide means for the drive of said driven shaft in a direction opposite to that of said driving shaft, an annular electromagnetic clutch element carried by said driven shaft and encircling said case and arranged adjacent another side surface of said armature assembly, energization of said clutch element being effective to drivingly connect said carrier case and said driven shaft to provide means for the drive of said driven shaft in the same direction as said driving shaft, and a manually operable positive clutch mounted on one of said shafts and engageable between said carrier case and one of said driving or driven shafts to supply a mechanical connection between the driving and driven shafts providing a second means for effecting rotation of said shafts in the same direction.

3. In a transmission comprising a housing journalling a pair of axially aligned driving and driven shafts, a differential gear set connected between said shafts comprising a carrier case extending between and rotatably mounted on said shafts, a side gear drivingly mounted on each of said driving and driven shafts, said side gears being arranged in spaced apart, opposed relationship within said carrier case, pinion gearing journalled in said carrier case and arranged to extend between and meshingly engage said side gears, a ring-like armature drivingly connected to and shiftably mounted on said carrier case, an annular electromagnetic brake element fixed to said housing and encircling said case and arranged adjacent a side surface of said armature, energization of said brake element being effective to anchor said armature member and said carrier case to said housing to provide means for the drive of said driven shaft in a direction opposite to that of said driving shaft, an annular electromagnetic clutch element carried by said driven shaft and encircling said case and arranged adjacent another side surface of said armature, energization of said clutch element being effective to drivingly connect said carrier case and said driven shaft to provide means for the drive of said driven shaft in the same direction as said driving shaft, brake means mounted on said housing and arranged to be engaged with said driven shaft to anchor said driven shaft against rotation in either direction, and a manually operable clutch carried by one of said shafts and engageable between said carrier case and one of said driving or driven shafts to supply a mechanical connection between the driving and driven shafts providing a second means for effecting rotation of said shafts in the same direction.

4. In a transmission comprising a housing journalling a pair of axially aligned driving and driven shafts, differential gearing arranged between said shafts comprising side gears drivingly connected to each of said shafts and arranged in opposed, axially spaced, relationship, a carrier case enclosing and journalled on said side gears, a pinion gear support mounted in said carrier case having radially extending spoke elements piercing said carrier case, pinion gears journalled on said spoke elements within said carrier case and arranged to extend between and meshingly engage said side gears, a first ring-like armature unit encircling said carrier case and drivingly connected to said pinion gear support and shiftable axially of the case, a pair of electromagnetic coil rings encircling said carrier case and arranged adjacent opposite sides of said first armature unit, one of said coil rings being fixed to said housing and the other of said coil rings being fixed to one of said shafts, a pair of second ring-like armature units encircling said carrier case and axially shiftable relative thereto, said pair of second armature units being drivingly connected to said carrier case and arranged such that each of said second armature units has an electromagnetic coil ring interposed between it and the first armature unit, said armature units and said coil rings being arranged concentrically about the gearing of the differential gear set and electrical circuit control means for said coil rings to provide for selective energization and deenergization of said coil rings.

5. In a transmission comprising a housing journalling a pair of axially aligned driving and driven shafts, differential gearing arranged between said shafts comprising side gears drivingly connected to each of said shafts and arranged in opposed, axially spaced, relationship, a carrier case enclosing and journalled on said side gears, a pinion gear support mounted in said carrier case having radially extending spoke elements piercing said carrier case, pinion gears journalled on said spoke elements within said carrier case and arranged to extend between and meshingly engage said side gears, a ring-like armature unit encircling said carrier case and drivingly connected to said pinion gear support and shiftable axially of the case, a pair of electromagnetic coil rings encircling said carrier case and arranged adjacent opposite sides of said armature unit, one of said coil rings being fixed to said housing and the other of said coil rings being fixed to one of said shafts, brake means carried by said housing adapted to be applied to said driven shaft to anchor said driven shaft against rotation, a manually operable clutch member carried by said driving shaft and connectible between said driving shaft and said carrier case, and electrical circuit control means for said coil rings to provide for selective energization and deenergization of said coil rings.

6. In a transmission comprising a housing journalling a pair of axially aligned driving and driven shafts, differential gearing arranged between said shafts comprising side gears drivingly connected to each of said shafts and arranged in opposed, axially spaced, relationship, a carrier case enclosing and journalled on said side gears, a pinion gear support mounted in said carrier case having radially extending spoke elements piercing said carrier case, pinion gears journalled on said spoke elements within said carrier case and arranged to extend between and meshingly engage said side gears, a ring-like armature unit encircling said carrier case and drivingly connected to said pinion gear support and said case and shiftable axially of the case, a pair of electromagnetic coil rings encircling said carrier case and arranged adjacent opposite sides of said armature unit, one of said coil rings being fixed to said housing and the other of said coil rings being fixed to one of said shafts, brake means carried by said housing adapted to be applied to said driven shaft to anchor said driven shaft against rotation, a manually operable clutch connectible between said driving shaft and said carrier case, said manually operable clutch comprising a toothed sleeve drivingly connected to said driving shaft and axially shiftable relative thereto, a toothed portion carried by said carrier case adapted to be drivingly engaged with said toothed sleeve, a shift lever for said toothed sleeve movably mounted on said housing, resilient means normally urging said toothed sleeve into engagement with said toothed portion of the carrier case and adjustable means mounted on said housing engageable with said shift lever to oppose said resilient means and hold said sleeve out of engagement with the case, and electrical circuit control means for said coil rings to provide for selective energization and deenergization of said coil rings.

JOHN P. BUTTERFIELD.
HENRY W. GILFILLAN.

References Cited in the file of this patent

UNITED STATES PATENTS

| Number | Name | Date |
| --- | --- | --- |
| 1,293,190 | Pollard | Feb. 4, 1919 |
| 1,476,458 | Murray | Dec. 4, 1923 |
| 1,932,983 | Morgan | Oct. 31, 1933 |
| 2,118,464 | Fitzhugh | May 24, 1938 |
| 2,236,631 | Thomas et al. | Apr. 1, 1941 |
| 2,296,520 | Griswold | Sept. 22, 1942 |
| 2,317,135 | Crittenden et al. | Apr. 20, 1943 |
| 2,547,038 | Parrish | Apr. 3, 1951 |
| 2,587,015 | Walter | Feb. 26, 1952 |
| 2,613,773 | Gilfillan | Oct. 14, 1952 |

FOREIGN PATENTS

| Number | Country | Date |
| --- | --- | --- |
| 30,791 | Norway | June 7, 1920 |
| 136,468 | Great Britain | Dec. 18, 1919 |
| 433,627 | Great Britain | Aug. 19, 1935 |